United States Patent
Mori

(10) Patent No.: US 6,678,839 B2
(45) Date of Patent: Jan. 13, 2004

(54) TROUBLESHOOTING METHOD OF LOOPED INTERFACE AND SYSTEM PROVIDED WITH TROUBLESHOOTING FUNCTION

(75) Inventor: Yoshiaki Mori, Tokyo (JP)

(73) Assignee: NEC Corporation, Tokyo (JP)

( * ) Notice: Subject to any disclaimer, the term of this patent is extended or adjusted under 35 U.S.C. 154(b) by 526 days.

(21) Appl. No.: 09/772,952

(22) Filed: Jan. 31, 2001

(65) Prior Publication Data

US 2001/0011357 A1 Aug. 2, 2001

(30) Foreign Application Priority Data

Feb. 1, 2000 (JP) ........................................ 2000-023604

(51) Int. Cl.[7] ................................................ G06F 11/00
(52) U.S. Cl. ................................ 714/44; 714/42; 714/5; 398/3
(58) Field of Search ............................ 714/5, 8, 42, 44; 398/2, 3, 4

(56) References Cited

U.S. PATENT DOCUMENTS 6,128,750 A * 10/2000 Espy et al.
6,430,714 B1 * 8/2002 McAdam et al.
6,438,714 B1 * 8/2002 Canestaro et al.
6,490,253 B1 * 12/2002 Miller et al.
6,546,498 B1 * 4/2003 Saegusa
6,557,121 B1 * 4/2003 McLaughlin et al.
2002/0191537 A1 * 12/2002 Suenaga

* cited by examiner

Primary Examiner—Scott Baderman
Assistant Examiner—Joshua Lohn
(74) Attorney, Agent, or Firm—Sughrue Mion, PLLC

(57) ABSTRACT

In a system using a looped interface, a faulty device and a disconnected location respectively causing a link fault are specified. Plural devices 200 are connected to the looped interface 120 and a port bypass circuit 210 detaches the faulty device from the looped interface. A port bypass circuit controller 100 controls port bypass circuits and sequentially detaches a device from the looped interface when a link of the looped interface is disconnected. It is checked whether a loop fault continues or not after the device is detached. The operation is repeated by the number of the devices to acquire the result of the check and a device causing the loop fault is specified based upon the result of the check.

12 Claims, 9 Drawing Sheets

TROUBLESHOOTING METHOD OF LOOPED INTERFACE AND SYSTEM PROVIDED WITH TROUBLESHOOTING FUNCTION

BACKGROUND OF THE INVENTION

1. Field of the Invention

The present invention relates to a troubleshooting method of a looped interface and a system provided with a troubleshooting function of the looped interface.

2. Description of the Related Art

For an interface in which devices are connected in a loop such as a Fibre Channel-Arbitrated Loop (FC-AL), as the connection of a cable is simple and correspondence to a network is also easy, such an interface has been often used recently, however, generally, there is a problem that when a signal cannot be normally transmitted in a loop because of a fault and others in an interface circuit of a connected device in an interface of such a type, the whole loop is disabled and all devices connected to the loop are disabled even if the fault is caused in one connected device. As a signal is transmitted from one device to an adjacent device in a loop such as FC-AL, the signal cannot be transmitted ahead from one device in the loop when a fault is caused in the device and when viewed from a port of a fibre channel, the signal is not returned. The transmission of a signal is one-way traffic in a loop.

In case the whole loop is disabled because of a fault in one device, there is a problem that the influence of the fault is large, it also becomes difficult to specify the device in which the fault is caused and it takes much time to analyze the fault and remove the cause.

In an interface of such a type, not only in case a fault is caused in a device but in case a part of a loop is disconnected for example, all connected devices are disabled and it is also difficult to specify a disconnected location.

Recently, a hard disk drive (HDD) with an FC-AL interface has been often used, however, for a countermeasure of a problem that all devices connected to the same loop are disabled when a fault is caused as described above, normally, these devices are respectively provided with interface circuits for two ports so that each device can be connected to two independent loops, a method of enabling access to another loop even if one loop is disabled by a fault is often adopted and hereby, reliability is secured.

As described above, the reliability is enhanced by connecting to two independent interfaces, however, it is unchanged that it is difficult to specify a location of a fault such as a faulty device and a location in which a loop is disconnected, and the analysis and the maintainability are not greatly improved.

SUMMARY OF THE INVENTION

The object of the invention is to provide an analysis method to specify a faulty device and a disconnected location which respectively cause the trouble of a link in a system using a looped interface such as a fibre channel which has been recently often used for a disk array and others.

Another object of the invention is to provide a system having high reliability and maintainability a function of which can be recovered by dynamically analyzing a location of a fault and removing the fault if possible.

A troubleshooting method according to the invention is based upon a method of troubleshooting a looped interface used for a system provided with port bypass circuits via which plural devices are connected to a looped interface for detaching the devices from the looped interface and a controller that controls the port bypass circuits and comprises a step in which the controller controls the port bypass circuits and sequentially detaches the device from the looped interface when a link of the looped interface is disconnected, a step for checking whether a loop is faulty after the device is detached or not, a step for acquiring the result of the check by repeating the first and second steps by the number of devices and a step for specifying a device that causes the fault of the loop based upon the result of the check.

Further, a system according to the invention is based upon a system in which plural devices are connected to a looped interface and which is provided with a function for troubleshooting the looped interface and the device, comprises port bypass circuits for detaching the devices from the looped interface and a controller that controls the port bypass circuits, and the controller comprises a detaching unit for controlling the port bypass circuits and sequentially detaching the device from the looped interface when a link of the looped interface is disconnected, a first checking unit for checking whether a loop is faulty after the device is detached or not, a repeated check execution unit for repeating the detachment and the check by the number of the devices to acquire the result of the check and a device specification unit for specifying a device that causes the fault of the loop based upon the result of the check.

As described above, according to the invention, there is not only effect of facilitating the maintenance and the replacement more by specifying a device if the device causes a fault and displaying it so that a maintenance operator can recognize it and but effect of recovering from the fault of a loop by bypassing the device if a composed system has redundancy as a disk array and enabling the recovery of the function of the system. Also, as the range of a part causing a fault can be narrowed even if a device causing the fault cannot be bypassed and the fault is caused in the part having no redundancy, the maintenance can be facilitated more.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

DESCRIPTION OF THE PREFERRED EMBODIMENTS

Figure 1:
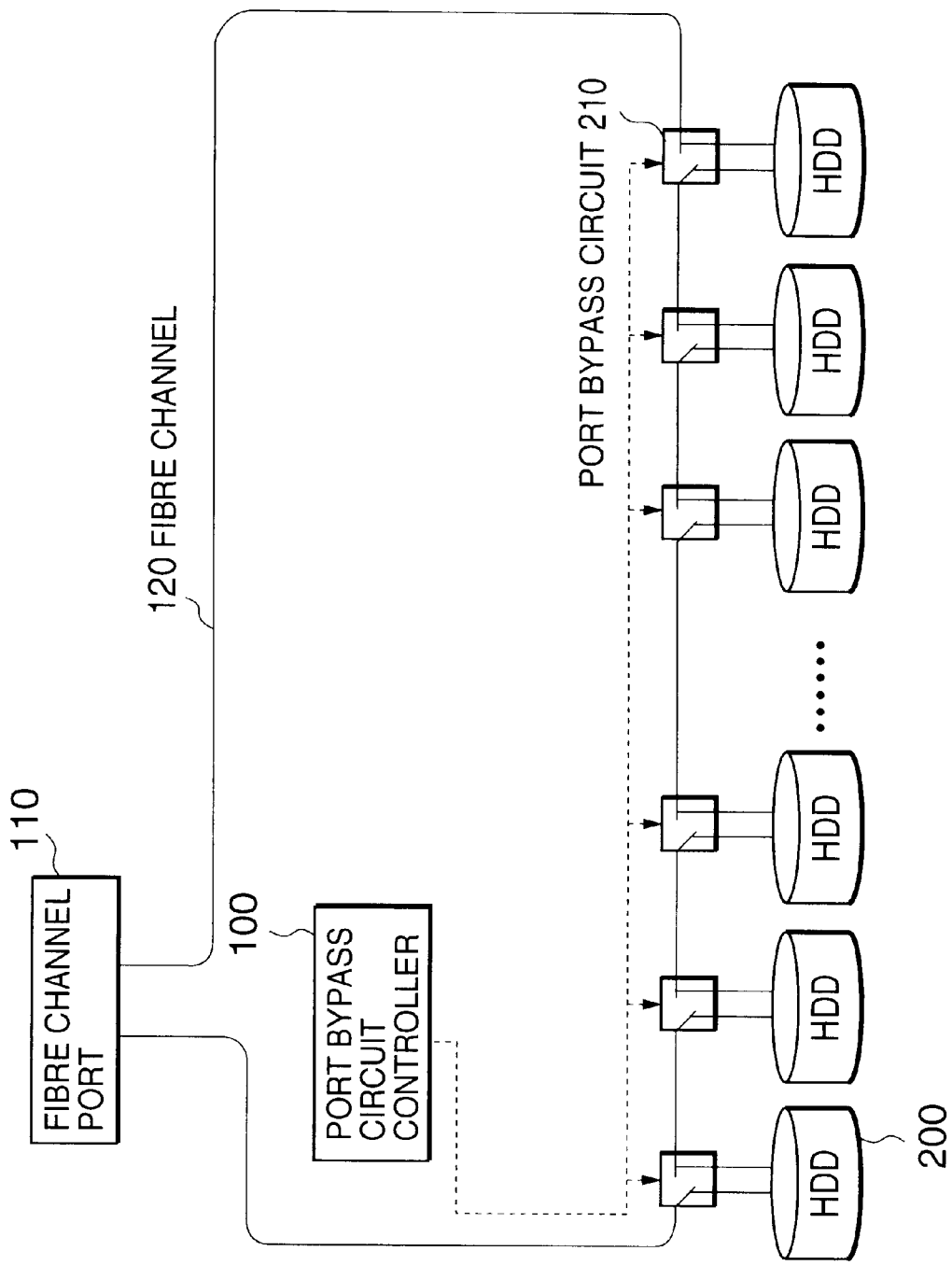
FIG. 1 shows an example of a disk array to which the invention is applied.

As shown in a disk array in FIG. 1, HDDs 200 are connected to a fibre channel 120 connected to a fibre channel port 110 that functions as a host for controlling devices in a loop as devices. The HDD 200 is connected to the fibre channel 120 via a port bypass circuit 210. The port bypass circuit 210 can arbitrarily select and control the building into a loop or the bypassing of each HDD 200 according to a port bypass circuit controller 100.

In case a looped interface is used, a device is generally connected via a port bypass circuit and for example, the port bypass circuit is used to bypass a signal on the loop without sending the signal to the device in case a control signal from a device is turned off so that the loop is not disconnected when a part of connected devices is powered off and is replaced.

In the disk array shown in FIG. 1, HDDs included in a redundant array of inexpensive disks (RAID) are connected via an FC-AL interface, a signal on the interface is interpreted by the interface circuit of each HDD 200 and only specific HDDs in the loop are controlled by transmitting the signal to the next HDD without being received by each interface circuit of HDDs except selected HDDS.

In the disk array shown in FIG. 1, the port bypass circuit controller 100 is realized by a microprogram run in the controller of the disk array and the port bypass circuit 210 is directly controlled by the microprogram.

Figure 2:
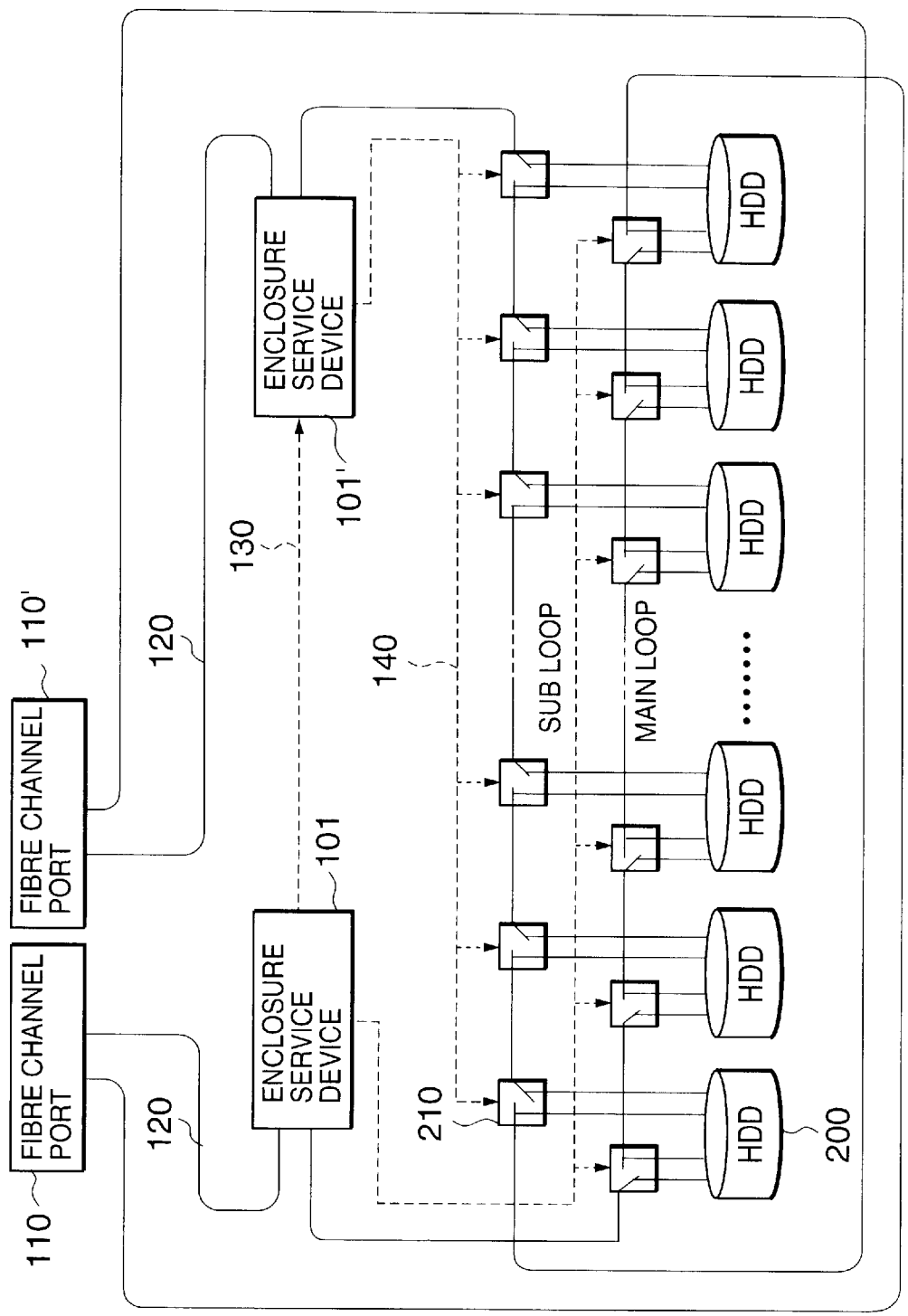
FIG. 2 shows another example of the disk array to which the invention is applied.

FIG. 2 shows another example of the disk array. In the disk array shown in FIG. 2, HDDs 200 included in RAID are similarly connected via the FC-AL interface, however, the FC-AL interface is doubled to prevent an access to all HDDs 200 from being disabled when a fault is caused in the loop and each HDD 200 can be accessed from both loops.

Also, in the disk array shown in FIG. 2, two FC-AL loops are provided and each enclosure service device 101, 101 is connected to each FC-AL loop. The enclosure service device 101 is a device for monitoring environment in the enclosure of a system provided in Standard by ANSI (NCITS 305-199X) and managing resources and also includes a function for controlling the port bypass circuit 210.

Further, each enclosure service device 101 or 101' connected to each loop is provided with an interface 130 for communicating with each other and all port bypass circuits can be controlled from both enclosure service devices 101 and 101'. In both FIGS. 1 and 2, the port bypass circuit controller is provided and the processing for troubleshooting the cause of a fault is executed using the controller.

Figure 4A:
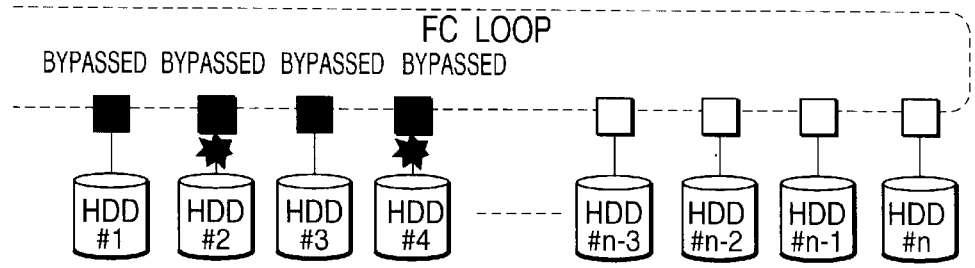
FIGS. 4A to 4D explain a procedure for bypassing HDDs to specify a faulty location when a fault is caused in plural HDDs in FIG. 1.
Figure 4B:
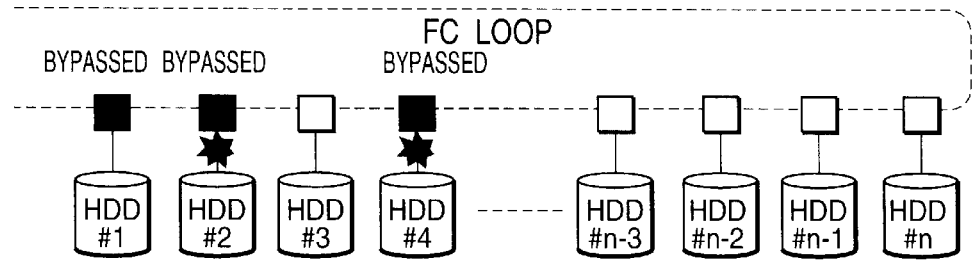
Figure 4C:
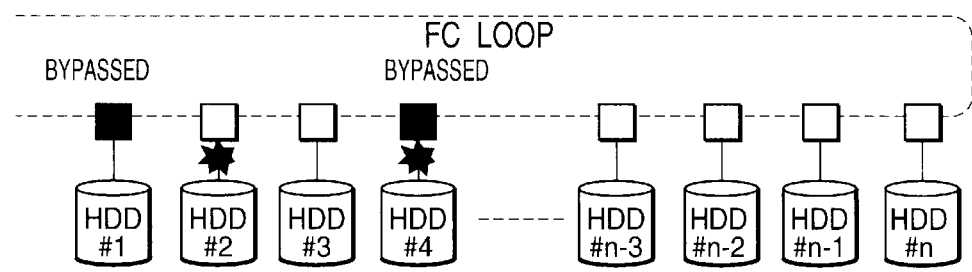
Figure 4D:
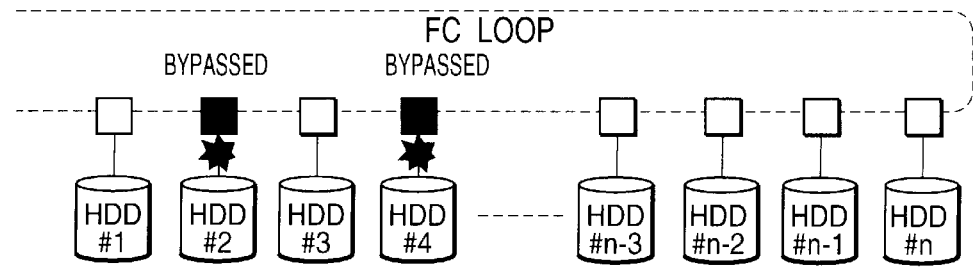
Figure 5:
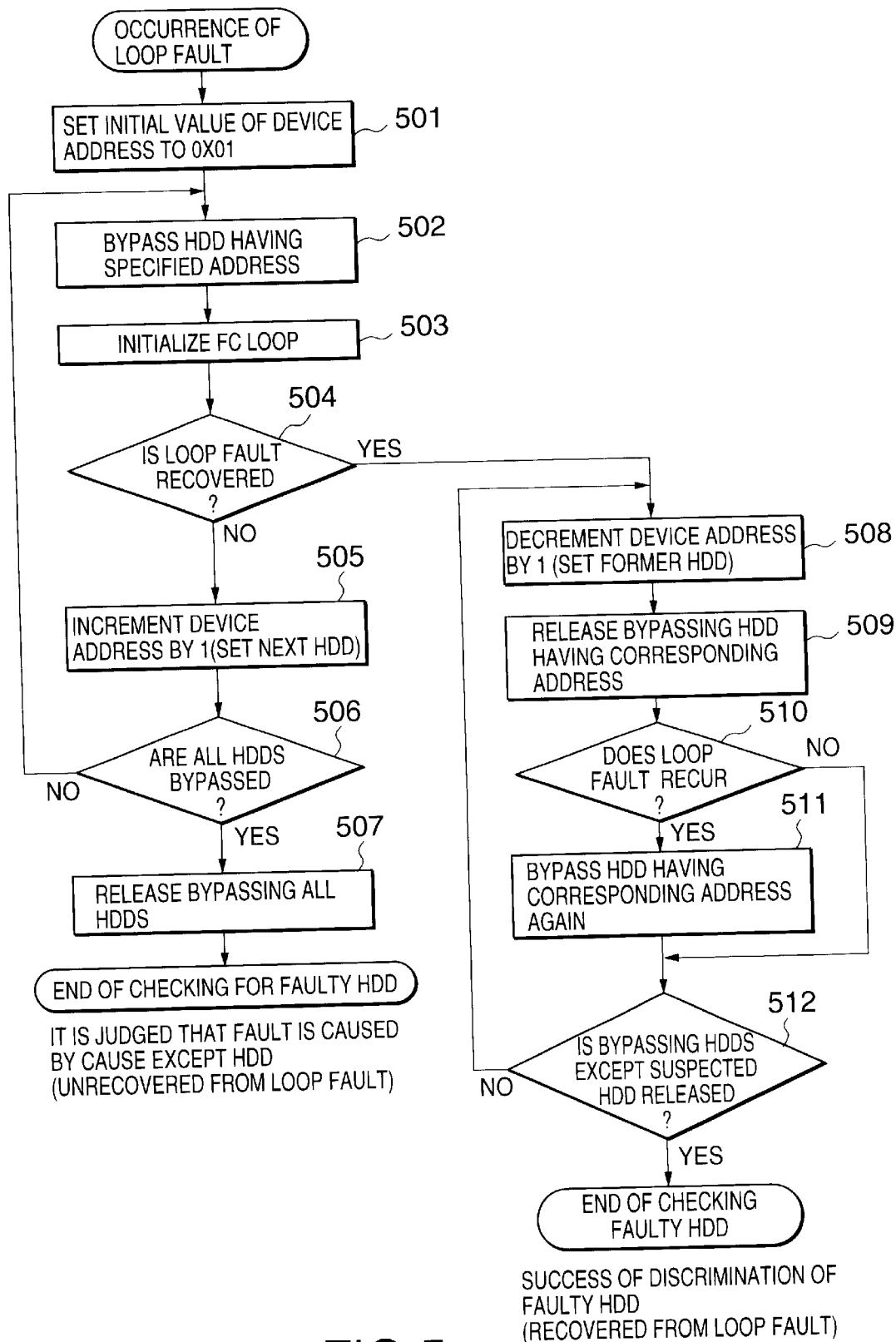
FIG. 5 is a flowchart for explaining operation for specifying the faulty location in FIG. 1.

Referring to FIGS. 3, 4 and 5, operation for troubleshooting the cause of a fault shown in FIG. 1 will be described below.

In the systems respectively shown in FIGS. 1 and 3, n pieces (n: 2 or a larger integer) of HDDs 200 are connected to one FC-AL loop and on the assumption that a signal cannot be transmitted on the interface loop and a loop fault is caused because a fault is caused in the interface circuit of fourth HDD, analysis operation will be described below.

When a loop fault is caused, an initial HDD address is first set to bypass HDD according to a fixed rule and is stored (a step 501 shown in FIG. 5). In this case, HDDs are bypassed in the ascending order of addresses and the address OX01 of a device (HDD) to be bypassed is stored.

Figure 3A:
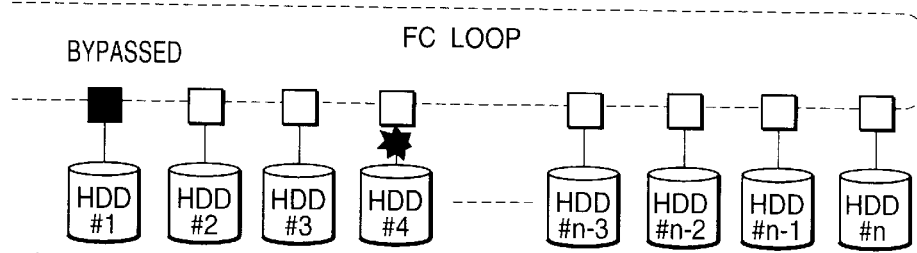
FIGS. 3A to 3E explain a procedure for bypassing HDD to specify a faulty location in FIG. 1.

As shown in FIG. 3A, HDD 200 having the stored address is bypassed from the interface loop using the port bypass circuit controller 100 (a step 502 shown in FIG. 5) and the loop is initialized (a step 503 shown in FIG. 5).

The initialization of the loop is executed when the fibre channel port 110 makes a predetermined packet rounded in the order of arrangement on the FC loop, checks HDD having what address is connected and writes the address of the connected HDD to the packet. When the packet is returned to the original fibre channel port 110 without an accident, it is judged that the system is recovered from the loop fault. In case the packet is not returned in fixed time, it is judged that the loop is disconnected and the loop fault is not recovered.

Figure 3B:
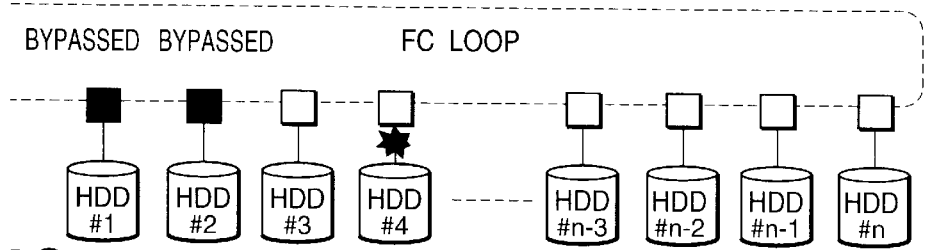

Every time HDD is bypassed by one and the loop is initialized as described above, it is checked whether the system is recovered from the loop fault or not (a step 504 shown in FIG. 5). In case the system is not recovered from the loop fault, 1 is added to the stored contents of the address of the HDD (the step 504 shown in FIG. 5) and as shown in FIG. 3B, HDDs are sequentially bypassed in ascending order.

Figure 3C:
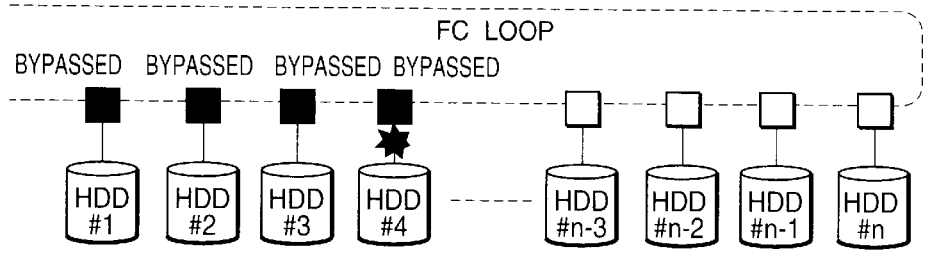
Figure 3D:
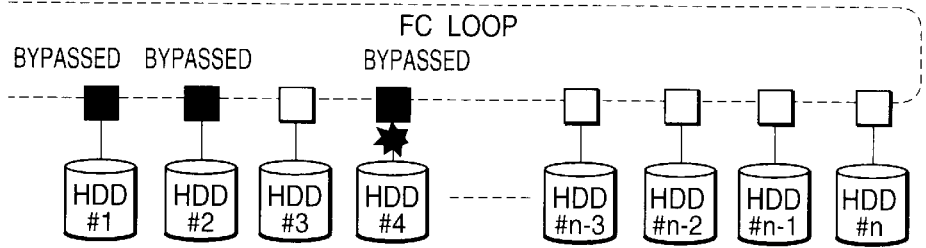

When the processing is repeated and the system is recovered from the loop fault as shown in FIG. 3C, HDD No. 4 last bypassed is judged to be HDD suspected of causing the loop fault. In case the suspected HDD is determined, 1 is subtracted from the stored contents of the address of the HDD (a step 508 shown in FIG. 5) and as shown in FIG. 3D, the bypassed HDD No. 3 is built into the loop (a step 509 shown in FIG. 5). That is, HDDs except the suspected HDD are built into the loop. Verifying that a loop fault does not recur by building HDDs in the loop (a step 510 shown in FIG. 5), bypassed HDDs are further sequentially built into the loop in descending order.

Figure 3E:
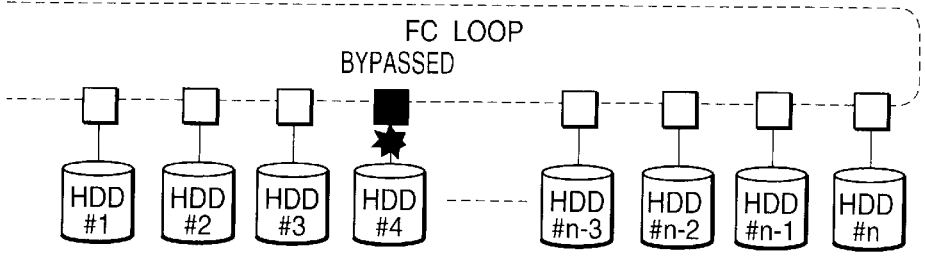

As shown in FIG. 3E, the port bypass circuits of all HDDs except the suspected HDD are finally released, repeating the processing and all the HDDs except the suspected HDD are built into the interface loop (a step 512 shown in FIG. 5). In case no loop fault recurs even if the port bypass circuits of all HDDs except the suspected HDD are released, the suspected HDD is judged to cause the fault and the processing for troubleshooting the fault is finished.

In the meantime, as shown in FIG. 4A, as a result of sequentially bypassing HDDs in ascending order, a case that though the system is recovered from a loop fault as in the troubleshooting processing, plural HDDs causing the fault are included in bypassed HDDs is also conceivable.

Normally, possibility that the interface circuits of plural HDDs simultaneously fail is extremely low, however, in case power is supplied to plural HDDs by one power source for example, it is conceivable that the plural HDDs abnormally operate because of the abnormal operation of the common power source.

In case a loop fault is caused by plural HDDs as described above, the loop fault recurs when second suspected HDD is built into the loop though the system is once recovered from the loop fault as shown in FIGS. 4B and 4C in a process that bypassed HDDs are sequentially built into the loop in the steps 508 to 512 shown in FIG. 5. In case a loop fault recurs in a process that bypassed HDDs are built into the loop as described above, the HDD last built is also treated as suspected HDD and is bypassed (a step 511 shown in FIG. 5).

HDD causing a loop fault is bypassed by executing a series of processing described above, can be defined and the system can be recovered from the loop fault.

Further, in the case of the disk array having redundancy, the system can be also functionally operated without hindrance in a range which the redundancy permits even if HDD is bypassed.

Also, in case a fault is caused except HDD by the fibre channel port 110 or the disconnection of a signal conductor in the loop for example, the loop fault is not solved even if all HDDs are bypassed. In this case, all bypassed port bypass circuits are released, HDDs are restored to a state that they are built into the loop (a step 507 shown in FIG. 5), it is judged that the fault is caused except HDD and the troubleshooting processing is finished.

In case a fault is caused except HDD, the loop fault cannot be solved, however, differently from HDD in the disk array system, the fibre channel port 110 or a signal conductor in the loop itself generally has no redundancy. For example, in case redundancy is applied to the interface loop, redundancy is applied to the whole system by doubling and it is meaningless to try to recover the interface loop in which a fault is caused. Then, a state of the port bypass circuit is only restored for later replacement of parts and processing is finished by only analysis for narrowing a range of the cause of the fault.

In the example shown in FIG. 2, as described above, HDDs included in RAID are similarly connected via the FC-AL interface, however, to avoid a situation that all HDDs cannot be accessed when a loop fault is caused, the FC-AL interface is doubled beforehand and each HDD can be accessed from both loops. Also, an enclosure service device 101, 101' is connected to each FC-AL loop. The enclosure service device 101 is a device for monitoring environment in the enclosure of the system provided in Standard by ANSI (NCITS 305-199X) and managing resources, is a device accessible from a host system connected to the disk array and also includes a function for controlling the port bypass circuit 210. Further, the enclosure service device 101, 101' connected to each loop is provided with an interface 130 for communicating with each other and is composed so that all port bypass circuits 210 can be controlled from both enclosure service devices 101 and 101'.

In the example shown in FIG. 2, a basic method of troubleshooting HDD is the same. The example shown in FIG. 2 is different only in a method of realizing the port bypass circuit controller by the enclosure service device 101. These enclosure service devices 101 and 101' operate as a device connected to the looped interface as HDD and control port bypass circuits 210 according to an instruction respectively issued from the fibre channel ports 110 and 110'.

In such configuration, in case a fault is caused in one interface loop, the enclosure service device connected to the other interface loop is instructed to control the port bypass circuits 210 because the enclosure service device connected to the loop cannot be instructed to control the port bypass circuits 210.

Figure 6:
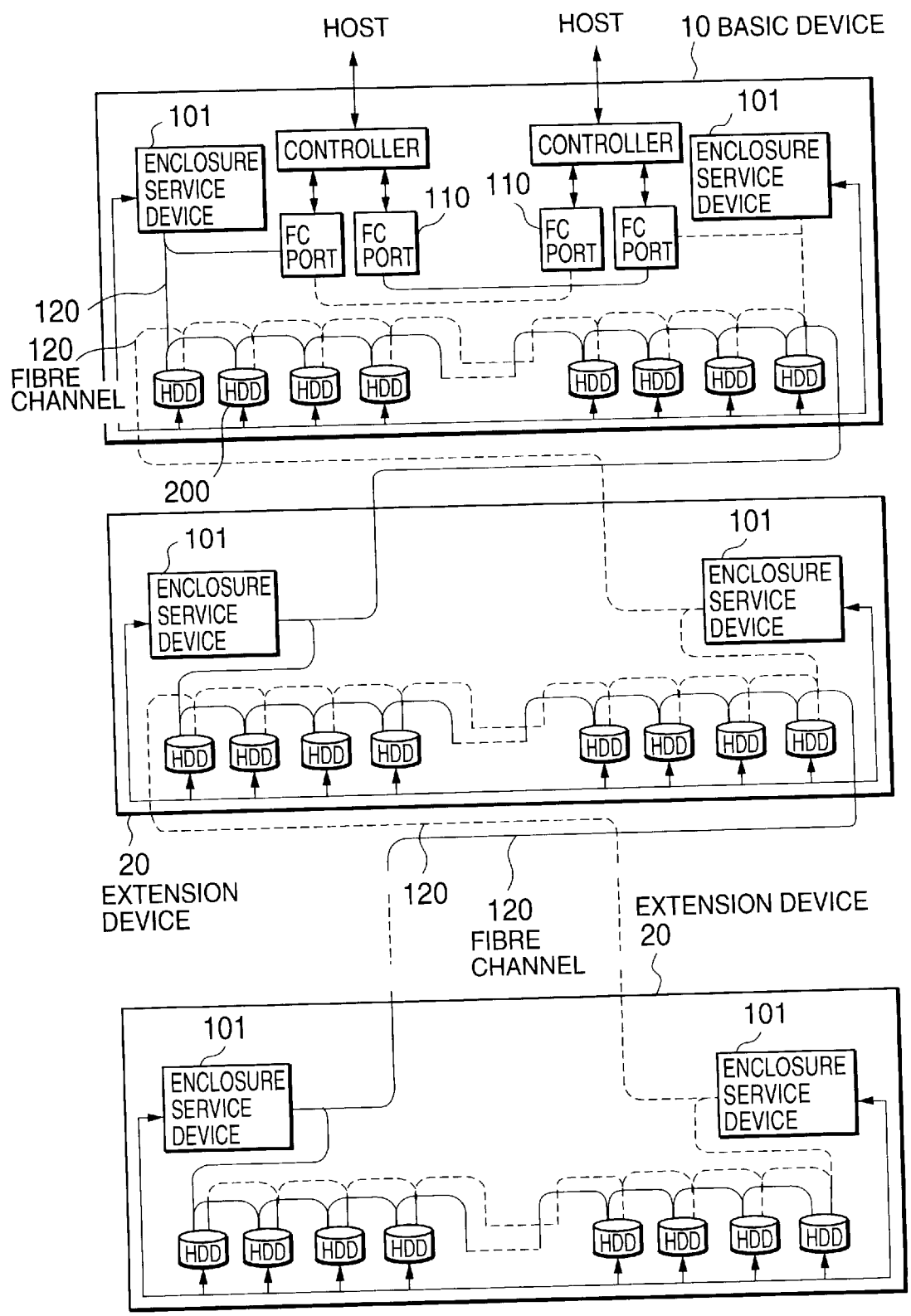
FIG. 6 shows an example that the number of devices connected to one loop is increased by extension devices.

FIG. 6 shows an example of the disk array adopting a fibre channel as an interface of each HDD included in RAID and as shown in FIG. 6, the number of devices connected to one loop can be increased by adding an extension device 20. In case a system including the extension device is adopted as described above, normally, the number of control signals which can be transmitted or received between independent devices is physically restricted and it is difficult to connect a signal conductor for controlling the port bypass circuit 210 corresponding to each HDD to a basic device 10.

Figure 7:
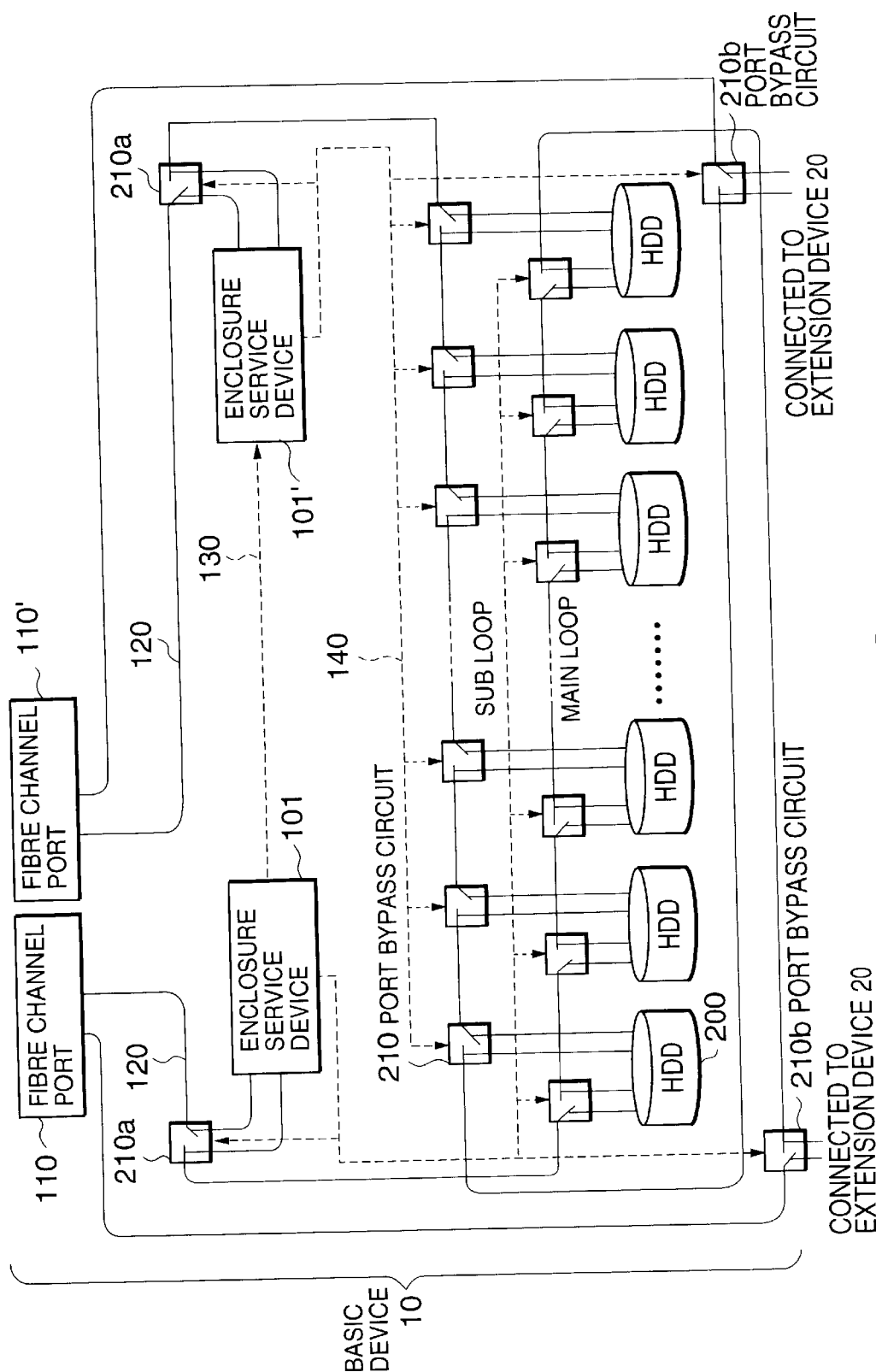
FIG. 7 shows an example of a basic device of a system that can specify a more narrowed faulty location.

However, the port bypass circuits 210 can be controlled from the fibre channel 120 by adopting not a method of directly controlling the port bypass circuit 210 shown in FIG. 1 but a method of controlling the port bypass circuit 210 via the enclosure service device 101 as shown in FIG. 2 even if configuration shown in FIGS. 6 and 7 is adopted. The reason is that the number of control signals is not physically restricted because a signal conductor for controlling a port bypass circuit 210b for connecting to the extension device 20 from the enclosure service device 101 of the basic device 10 in addition to the port bypass circuit 210 connected to each HDD 200 in the basic device as shown in FIG. 7 has only to be connected and the port bypass circuit 210 connected to HDD 200 in the extension device 20 is not required to be controlled.

Therefore, in the system including the extension device, the port bypass circuit controller can be also easily realized. Therefore, troubleshooting is enabled by the same method as the method of troubleshooting a fault.

In FIG. 6, only the approach route of the fibre channel 120 connected from the enclosure service device 101 to each HDD 200 is shown, however, actually the return route to the enclosure service device 101 exists and the whole route forms a loop.

The above each example is described in view of the analysis of HDD causing a loop fault or the analysis of a fault caused except HDD, however, in case the enclosure service device 101 is connected to the interface loop as shown in FIG. 2, the enclosure service device 101 itself includes an interface circuit as HDD and a loop fault caused by the fault of the interface circuit is also conceivable.

A loop fault is analyzed using the port bypass circuit 210 only for a connection to HDD in the example shown in FIG. 2, however, in the example shown in FIG. 7, the port bypass circuit 210 is also applied as a connection to the extension device 20 in case the enclosure service device 101 and the extension device 20 as shown in FIG. 6 are increased. A faulty location except HDD causing a loop fault can be more narrowed using this as in the troubleshooting method.

A troubleshooting method shown in the example in FIG. 7 will be described below.

First, connected HDD is troubleshooted. As this is performed according to the flowchart shown in FIG. 5, the description is omitted.

In case the system is not recovered from the loop fault even if all HDDs are bypassed in the step 506 for troubleshooting shown in FIG. 5, the bypassing of all the HDDs is released (the step 507 shown in FIG. 5) and it is judged that the fault is caused except HDD. However, as plural enclosure service devices 101 are mounted in case the extension device 20 is connected as shown in FIG. 7, the enclosure service device 101 is troubleshooted in consideration of the possibility of a loop fault due to the fault of an individual enclosure service device 101. As a basic method of troubleshooting is the same as that in the flowchart shown in FIG. 5, it will be described based upon FIG. 5. To simplify the description, one of two fibre channel loops is called a main loop, the other is called a subloop and assuming that a loop fault is caused in the main loop, its troubleshooting method will be described.

Figure 9:
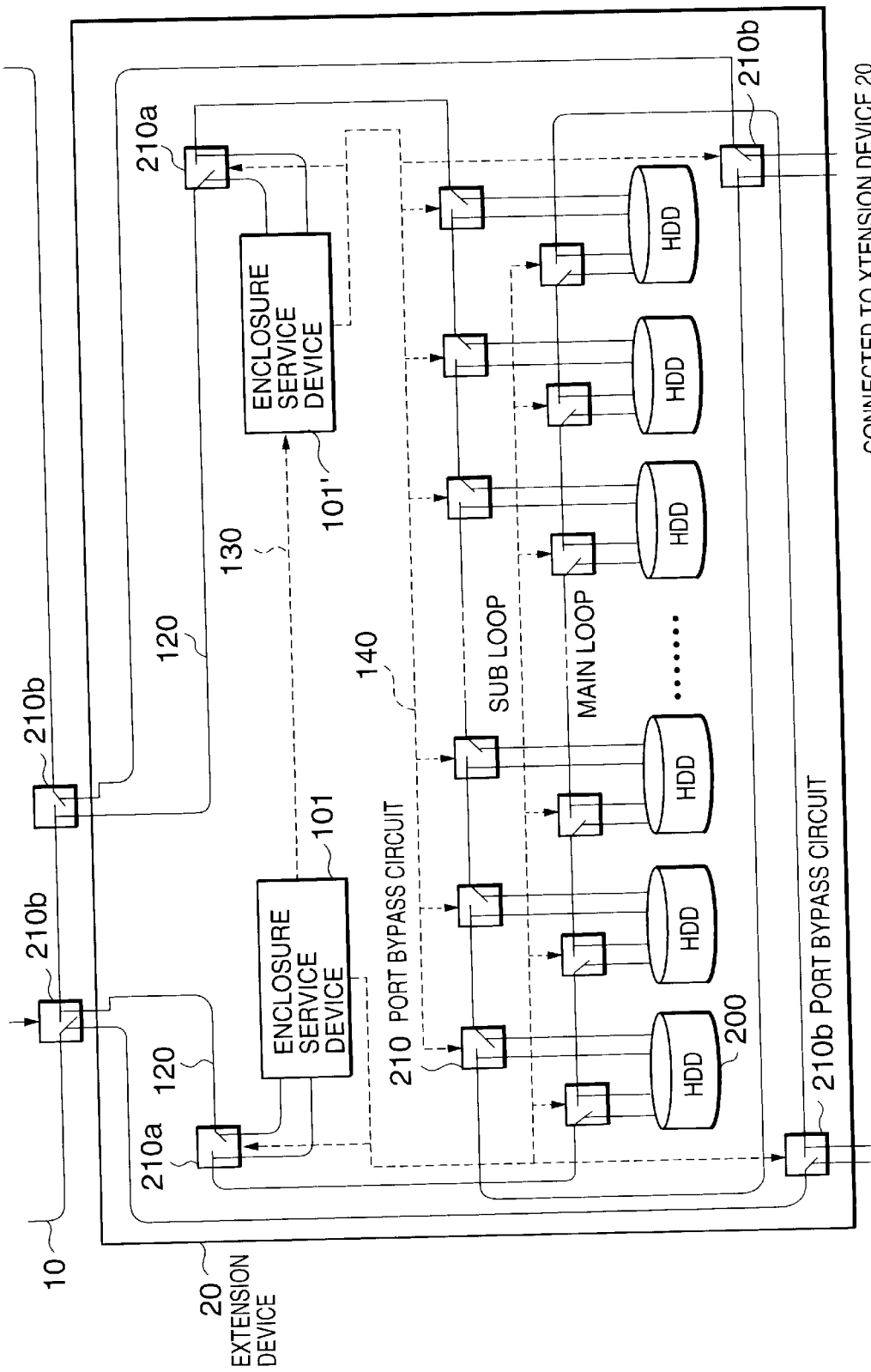
FIG. 9 shows an example of the extension device.

It is conceivable that the extension device 20 connected to the basic device shown in FIG. 7 is composed by the basic device 10 shown in FIG. 7 from which fibre channel ports 110 and 110' are removed as shown in FIG. 9. The extension device 20 is connected to the port bypass circuit 210b in the basic device 10 in place of the fibre channel ports 110 and 110'.

First, the address of an enclosure service device (in the basic device 10 in this case) having the smallest number of plural enclosure service devices 101 is stored as an object to be bypassed (the step 501). Next, an enclosure service device connected to the main loop is bypassed from the loop by bypassing a port bypass circuit 210a shown in FIG. 7 connected to an enclosure service device connected to the subloop (the step 502 shown in FIG. 5) and the main loop is initialized (the step 503 shown in FIG. 5).

The initialization of the loop is executed when the fibre channel port 110 makes a predetermined packet rounded on the FC loop in the order of arrangement, checks an enclosure service device 101 of what address is connected and writes the address of the connected enclosure service device to the packet. It is judged that the system is recovered from the loop fault when the packet is returned to the original fibre channel port 110 without an accident. It is judged that when the packet is not returned in fixed time, the loop is disconnected and the loop fault is not solved. As it is verified that HDD 200 under the control of the enclosure service device 101 has no fault in principle even when the enclosure service device 101 is bypassed, the HDD is not bypassed.

In case the system is not recovered from the loop fault, the stored contents of the device address are updated to the address of the next enclosure service device (the step 504 shown in FIG. 5) and the enclosure service devices are sequentially bypassed.

The processing is repeated and in case the system is recovered from the loop fault, the enclosure service device last bypassed is judged to be a device suspected of causing the loop fault.

When the suspected device is determined, the stored contents of the device address are updated to the address of the enclosure service device having a smaller number (the step 508 shown in FIG. 5) and the bypassed enclosure service device is built into the loop (the step 509 shown in FIG. 5). The bypassed enclosure service devices are further sequentially built into the loop in descending order, verifying that a loop fault does not recur by building the enclosure service device into the loop (the step 510 shown in FIG. 5).

The processing is repeated until the port bypass circuits of all enclosure service devices except the suspected device are finally released and are built into the interface loop (the step 512 shown in FIG. 5). When a loop fault does not recur even if the port bypass circuits of all devices except the suspected device are released, it is judged that the suspected enclosure service device causes the fault and the processing for troubleshooting the fault is finished.

In this case, troubleshooting is finished in a state in which the system is recovered from the loop fault with the enclosure service device causing the fault bypassed as HDD, however, for HDD in the disk array having redundancy, as a logical disk composed of plural HDDs normally functions though the logical disk loses redundancy even if faulty HDD is detached, it is more advantageous to bypass the faulty HDD and solve the loop fault. However, in the case of the enclosure service device, as it loses its function by bypassing it, there may be no merit of solving a loop fault by bypassing resources to be connected (an enclosure service device). That is, if a faulty location can be specified, there may be no problem even if a state of a loop fault is maintained. In such a case, before troubleshooting processing is finished after processing for releasing bypassing is finished in the steps 508 to 512 and the bypassing of the enclosure service devices except the suspected device is released and the faulty device is determined, the bypassing of the enclosure service device judged to be a faulty device is also released and the processing may be also finished in a state of the loop fault.

In case the system is not recovered from the loop fault even if all enclosure service devices are bypassed as a result of bypass processing in the steps 502 to 506, the port bypass circuits of all bypassed devices are released, all the enclosure service devices are restored to a state in which they are built into the loop (the step 507 shown in FIG. 5) and it is judged that the fault is caused except the enclosure service devices.

In case it is made clear by the troubleshooting that a fault is not caused by HDDs and the enclosure service devices respectively connected to the interface loop in which the loop fault is caused, possibility that the loop fault is caused by other cause such as the fibre channel port 110 and the disconnection of a fiber channel signal conductor is conceivable. Next, referring to a flowchart shown in FIG. 8, processing for troubleshooting a faulty location by a cause except HDDs and the enclosure service devices will be described below.

Particularly, in case plural extension devices 20 are connected and devices connected to the same interface are added as shown in FIG. 7, the possibility of a fault such as the disconnection of a coupling cable between extension devices and contact failure is conceivable. Normally, it is difficult to recover from these faults without the help of personnel for maintenance or providing a special mechanism for recovery, however, the number of parts to be replaced for recovery can be reduced by specifying a faulty location.

In this case, an address is individually allocated to the extension device 20, however, this does not means that the extension device 20 requires an address. HDDs and an enclosure service device respectively connected to the same loop are included in each extension device 20, at least information for identifying these is required and these may be also identified by information except the address. However, to simplify the description in this case, addresses continuous in ascending order in the order of connection from the basic device 10 are allocated.

Figure 8:
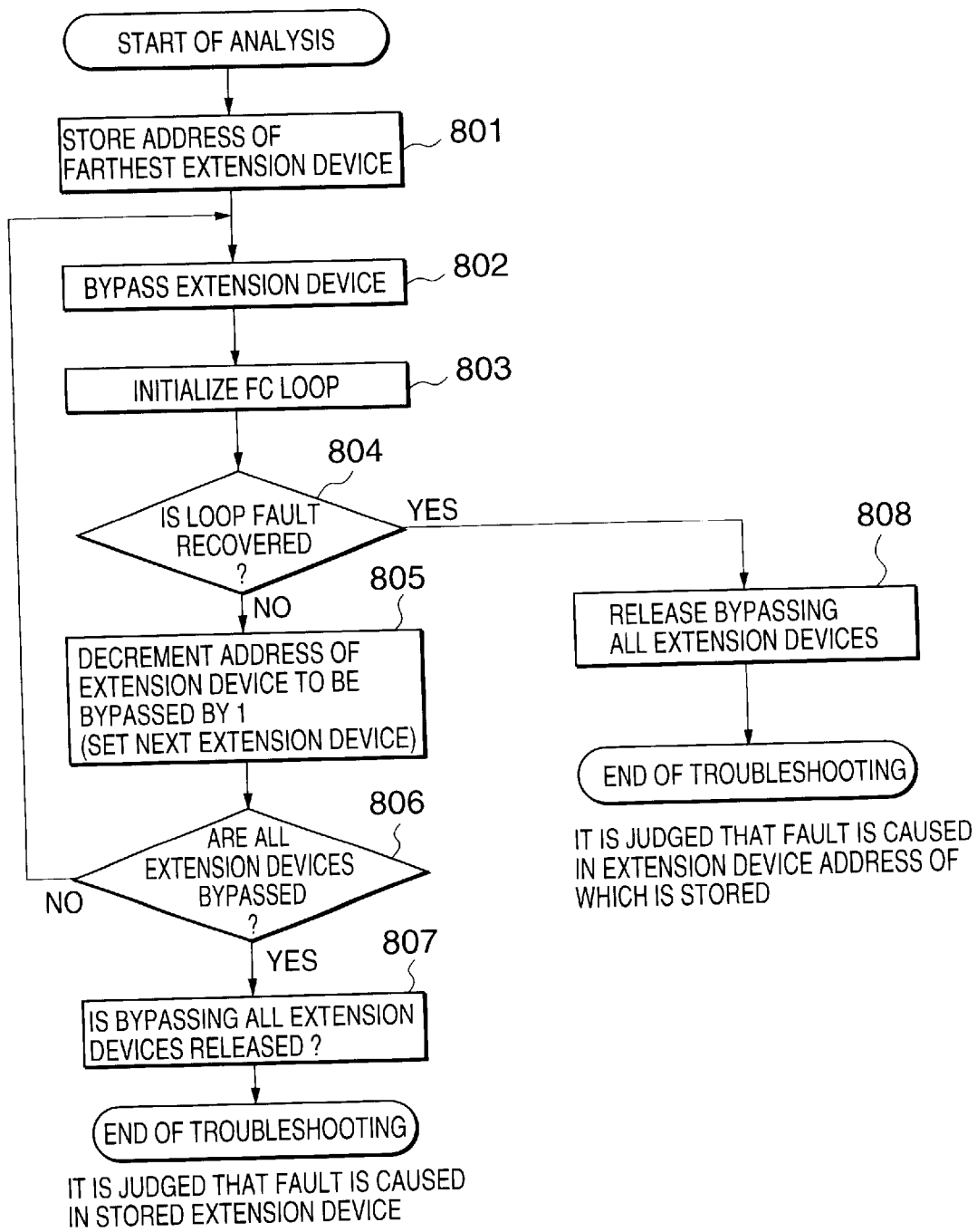
FIG. 8 is a flowchart for explaining the fault specification operation of the system shown in FIG. 7.

First, the address of the extension device 20 connected physically in the farthest position from the basic device 10 is stored (a step 801 shown in FIG. 8). The extension device 20 having the stored address is bypassed from the main loop for the enclosure service device connected to the subloop (a step 802 shown in FIG. 8) and the main loop is initialized (a step 803 shown in FIG. 8).

As a method of initialization is similar to the bypassing of the enclosure service device, the description is omitted.

An instruction for processing for bypassing the extension device 20 from the main loop in this case is issued to the extension device 20 having an address smaller than that of the extension 20 the address of which is stored as an object of bypassing by one or the enclosure service device in the basic device 10. That is, operation for bypassing the extension device 20 is executed by bypassing the port bypass circuits 210b shown in FIGS. 7 and 9 in the extension device connected in a position closer to the basic device 10 by one than the corresponding extension device 20 stored as the object of bypassing. Hereby, no signal is transmitted to the corresponding extension device 20.

Every time one extension device 20 is bypassed and the loop is initialized, it is checked whether the system is recovered from the loop fault or not (a step 804 shown in FIG. 8).

In case the system is not recovered from a loop fault, the stored address of the extension device 20 is decremented by one (a step 805 shown in FIG. 8) and the extension devices closer to the basic device 10 are sequentially bypassed. In case the processing is repeated and the loop fault is solved, the extension device 20 last bypassed is judged to be the extension device 20 causing the loop fault. If the extension device 20 causing the loop fault can be specified, it is determined as an object of maintenance, the bypassing of the all bypassed extension devices 20 is released and the troubleshooting is finished.

Also, in case the loop fault is not solved even if all extension devices 20 are bypassed, the loop fault is judged to be caused by a fault except HDDs and the enclosure service devices in the basic device 10 such as the fibre channel port 110 or the disconnection of a signal conductor of the loop in the basic device 10, the bypassing of all the bypassed extension devices 20 is released, the extension devices are restored in a state in which they are built in the loop (a step 807 shown in FIG. 8) and the troubleshooting processing is finished.

As described above, according to the invention, there is effect that a faulty location causing a loop fault can be specified by arbitrarily controlling the port bypass circuits that connect devices to the looped interface, bypassing the connected devices and building them into the loop according to a specific rule such as the ascending order and the descending order of addresses.

Particularly, in the system that HDDs are connected via the looped interface in the disk array, though a loop fault had an effect upon a large range and troubleshooting was not easy, troubleshooting is facilitated, the cause of the fault is removed by bypassing HDD causing the fault based upon the result of the analysis without replacing parts, making the best use of the redundancy of the disk array, the loop fault is solved and the operation can be continued. Therefore, the reliability and the availability can be improved.

Further, as troubleshooting can be automated, analysis work by personnel for maintenance for determining parts to be replaced is not required and there is also effect that the maintainability can be improved.

In addition, as a faulty location can be narrowed beforehand even if a fault is not caused by a part having redundancy as HDD, the maintainability can be improved.

Also, in case the port bypass circuit connects the device via the looped interface, it is required for detaching the device, the addition of special hardware is not required to realize the invention and the cost is never increased.

While this invention has been described with reference to illustrative embodiments, this description is not intended to be construed in a limiting sense. Various modifications of the illustrative embodiments as well as other embodiments of the invention, will be apparent to persons skilled in the art upon reference to this description. It is, therefore, contemplated that the appended claims will cover any such modifications or embodiments as fall within the true scope of the invention.

What is claimed is:

1. A method of troubleshooting a looped interface used for a system provided with a port bypass circuit for detaching a device from the looped interface to which plural devices are connected and a controller that controls the port bypass circuit, comprising:

a step for controlling the port bypass circuit by the controller when a link of the looped interface is disconnected and sequentially detaching a device from the looped interface;

a step for checking whether a loop fault is caused or not after the device is detached;

a step for acquiring the result of the check by repeating the first and second steps by the number of the devices; and a step for specifying a device causing the loop fault based upon the result of the check.

2. A method of troubleshooting a looped interface according to claim 1, wherein:

the looped interface is Fibre Channel-Arbitrated Loop (FC-AL).

3. A method of troubleshooting a looped interface according to claim 1, wherein:

the step for detaching a device from the looped interface includes a substep for determining an initial address for bypassing the device according to a predetermined rule when a loop fault is caused and a substep for controlling the port bypass circuit and detaching the device corresponding to the initial address from the looped interface to bypass;

the step for acquiring the result of the check includes a substep for acquiring an added address by incrementing the initial address by one and detaching a device corresponding to the added address every time from the looped interface to bypass and a substep for checking whether a loop fault is caused or not every addition; and the step for specifying a device includes a substep for judging that a bypassed device is a suspected device causing the loop fault in case the loop fault is solved every bypassing and a substep for sequentially building devices except the suspected device into the looped interface.

4. A method of troubleshooting a looped interface according to claim 1, wherein:

the looped interface is doubled.

5. A method of troubleshooting a looped interface according to claim 1, wherein:

the device is a hard disk drive.

6. A method of troubleshooting a looped interface according to claim 4, wherein:

the controller is provided with an enclosure service device that controls port bypass circuits in the loop every loop; and the device is the enclosure service device.

7. A system in which plural devices are connected to a looped interface and which is provided with a troubleshooting function related to the looped interface and the device, comprising:

a port bypass circuit for detaching the device from the looped interface; and a controller that controls the port bypass circuit, wherein:

the controller comprises:

a detaching unit for controlling the port bypass circuit and sequentially detaching the device from the looped interface when a link of the looped interface is disconnected;

a first checking unit for checking whether a loop fault continues or not after the device is detached;

a repeated check execution unit for repeating the detachment and the check by the number of devices and acquiring the result of the check; and a device specification unit for specifying a device causing the loop fault based upon the result of the check.

8. A system provided with a function for troubleshooting a looped interface according to claim 7, wherein:

the looped interface is FC-AL.

9. A system provided with a function for troubleshooting a looped interface according to claim 7, wherein:

the detaching unit comprises:

means for determining an initial address for bypassing the device according to a predetermined rule when a loop fault is caused; and means for controlling the port bypass circuit and detaching the device corresponding to the initial address from the looped interface to bypass;

the repeated check execution unit comprises:

means for acquiring an added address by incrementing the initial address by one and detaching the device corresponding to the added address from the looped interface every time to bypass; and means for detaching and checking every addition; and the device specification unit comprises:

means for judging that the bypassed device is a device suspected of causing a loop fault in case the loop fault is solved every bypassing; and means for sequentially building devices except the suspected device into the looped interface.

10. A system provided with a function for troubleshooting a looped interface according to claim 7, wherein:

the looped interface is doubled.

11. A system provided with a function for troubleshooting a looped interface according to claim 10, wherein:

the controller is provided with an enclosure service device that controls port bypass circuits in the loop every loop; and the device is the enclosure service device.

12. A system provided with a function for troubleshooting a looped interface according to claim 7, wherein:

the device is a hard disk drive.

\* \* \* \* \*